United States Patent Office 3,505,756
Patented Apr. 14, 1970

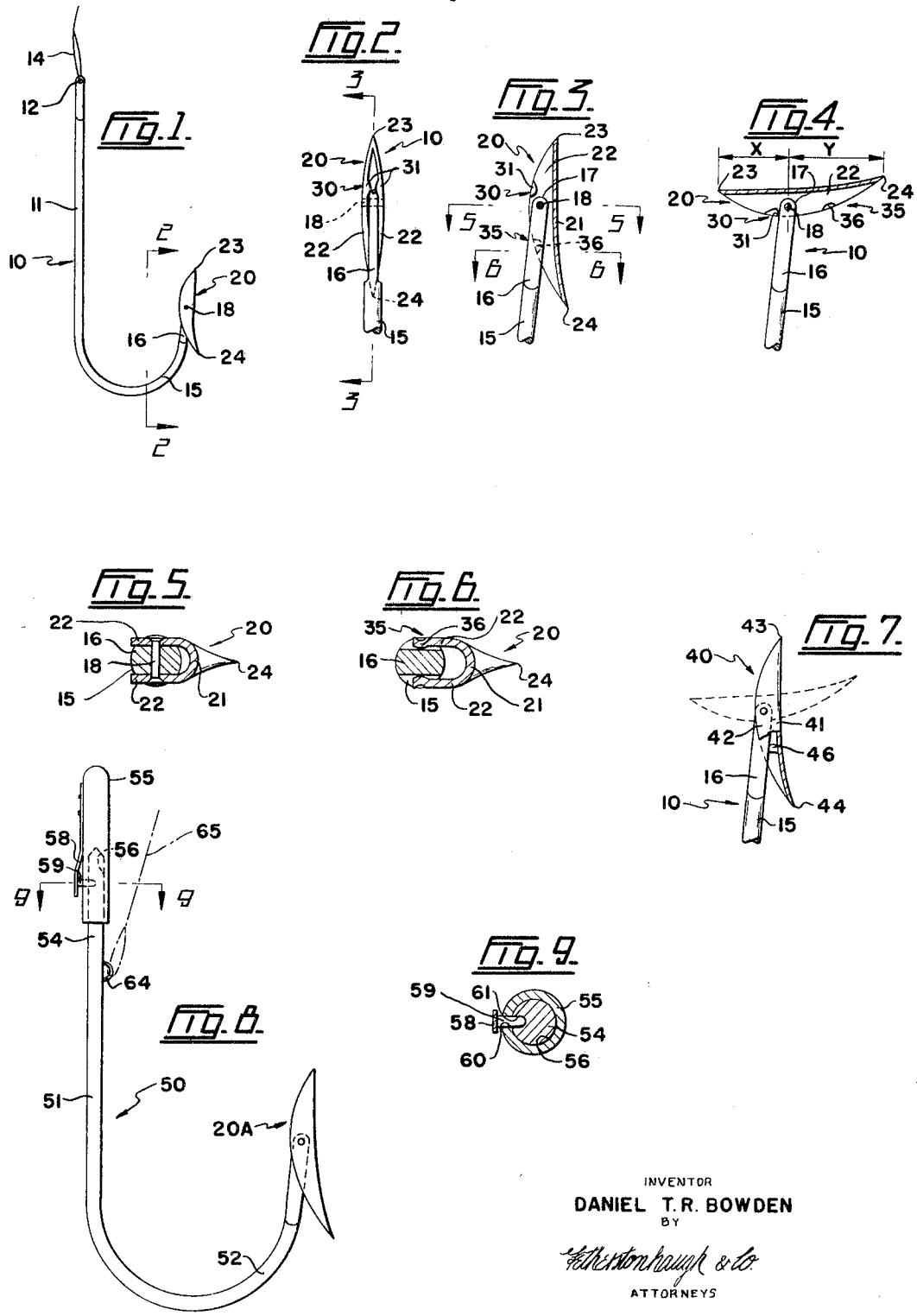

3,505,756
HINGED BARB FISHHOOK
Daniel T. R. Bowden, Campbell River, British Columbia, Canada (P.O. Box 99, Quesnel, British Columbia, Canada)
Filed Apr. 24, 1968, Ser. No. 723,817
Int. Cl. A01k 83/00
U.S. Cl. 43—43.16          5 Claims

ABSTRACT OF THE DISCLOSURE

A fish catching device comprising a hook having a barb hingedly mounted on the hook portion for swinging movement between a normal or set position substantially aligned with the hook portion and an angular or cross position relative to the hook portion. Latching means is provided for releasably retaining the barb in the normal or set position.

BACKGROUND OF THE INVENTION

This invention relates generally to devices for seizing and holding a fish and more particularly to a fish hook with a hinged barb.

It is much more difficult for a fish to escape from a hook with a hinged barb than it is from one with a conventional fixed barb but hooks with hinged barbs as presently used, have a number of serious disadvantages which largely offset their more positive snagging action. For example, some hooks with swingable barbs are encumbered with extraneous parts which make them difficult to bait and even more difficult for a fish to seize in his mouth. Also, the fish must strike the hook in a particular manner, otherwise the barb will not be released to the desired angular position. Other factors which may explain why such hooks do not appear to have received widespread acceptance are; the relatively high cost of the rather complex hooks, the care and attention which must be given to set the hooks, and the fact that such hooks lack the strength and durability of hooks with fixed barbs.

SUMMARY OF THE INVENTION

I have found that these disadvantages of conventional hinged barb hooks can be overcome by providing a hook of an extremely simplified construction. My hook can be made of any required size and yet can be made strong enough to withstand the abuse to which it is likely to be subjected. Also, the hook is very easy to set in a position of use and to bait if bait is to be attached directly to the hook. The barb is balanced in such a way that it normally assumes a set position and very easily released latching means is provided to retain the barb in the normal or set position. One embodiment of the hook has a handle which can readily be removed to permit the device to be passed through a fish in the same direction as it entered.

BRIEF DESCRIPTION OF THE DRAWINGS

FIGURE 1 is a side elevation of the fishhook, in accordance with one embodiment of the present invention,
FIGURE 2 is a detail view taken on the line 2—2 of FIGURE 1,
FIGURE 3 is a section taken on line 3—3 of FIGURE 2 and showing the barb in normal position,
FIGURE 4 is a view similar to FIGURE 3 and showing the barb in cross position,
FIGURE 5 is a section taken on the line 5—5 of FIGURE 3,
FIGURE 6 is a section taken on the line 6—6 of FIGURE 3,
FIGURE 7 is a detail view of another embodiment of the invention,
FIGURE 8 is an elevational view of still another embodiment of the invention, and
FIGURE 9 is a section taken on the line 9—9 of FIGURE 8.

DESCRIPTION OF THE PREFERRED EMBODIMENT

Referring to FIGURES 1 to 6 of the drawing, the numeral 10 indicates generally a fishhook having a shank 11. One end of shank 11 has an eye 12 to which a leader 14 is adapted to be attached in the usual manner. Near its opposite end, the shank 11 is reversely curved to provide a hook portion 15 which may be circular in cross section. Portion 15 terminates in a flattened or oval-shaped portion 16 which has a rounded upper end 17.

Secured to the end 17, by means of a hinge pin 18, is a barb generally indicated at 20. Barb 20 is formed of a thin piece of sheet metal which is rolled and later suitably hardened to provide the barb with a body 21 having side flanges 22. The opposite ends of the body 21 are tapered and sharpened to provide a tip 23 and a spur 24. Both the tip and spur of the barb 20 are elongated and finely pointed and, when the barb is in the normal position of FIGURE 3, the tip 23 is above and slightly to the right of the portion 15 and the spur 24 curves outwardly of said portion also to the right to terminate near the lower end of the flattened portion 16. It will be noticed the body 21 generally conforms to and closely fits the flattened portion 16 and that the side flanges 22 have a width not greater than the width of the portion 15. Thus, the barb 20 does not add appreciably to the overall thickness of the hook and the device is capable of penetrating objects almost as readily as a hook with a fixed barb.

The transversely-disposed hinge pin 18 extends through the upper end 17 and the side flanges 22 of the barb so that said barb can swing in a longitudinal plane of the portion 16. As indicated in FIGURE 4, the tip 23 of the barb is spaced a lesser distance from the hinge pin 18 than the spur 24. In other words, the distance X is slightly less than the distance Y so that the barb 20 is overbalanced on the hinge pin and normally tends to assume the position shown in FIGURE 3. Movement of the hook 10 through the water also urges the barb 20 to the FIGURE 3 position.

Suitable stop means, generally indicated at 30, is provided to limit swinging movement of the tip 23 towards the shank 11. As shown in FIGURES 2, 3 and 4, means 30 comprises a pair of opposing lugs 31 which are suitably formed on the inner faces of the flanges 22. Thus, when the barb is swung from the normal position of FIGURE 3 to the cross position of FIGURE 4, the pair of lugs 31 engage the inner edge of the portion 16 to halt further movement of the barb in this direction.

The fishhook is provied with latching means for releasably securing the barb 20 to the portion 16, this means being generally indicated at 35. As shown in FIGURES 3, 4 and 6, the means 35 comprises two opposing indents 36 which are punched into the side flanges 22 near the spur 24. These indents 36 are suitably rounded and are spaced apart so as to grip opposite sides of the portion 16 as shown best in FIGURE 6. In order for the barb 20 to be latched to the hook in this manner, the side flanges 22 are required to be sprung slightly so that the indents will exert a very light pressure on the portion 16. Thus, a slight resistance initially is offered to swinging movement of the bar away from the normal position of FIGURE 3 but, once the barb is released from this normal position, it is free to swing to the cross position of FIGURE 4 whereupon further swinging movement is halted by the stop means 30.

From the foregoing, the operation of the hinged barb fishhook is believed to be readily apparent but briefly the hook is used with a lure or is baited in the usual manner. Once a fish strikes the hook, the barb is jarred free from its normal position and is caused to swing to an angular position where it is almost certain to be embedded firmly and deeply in the throat or mouth of the fish. Once the barb is rotated at an acute angle to the hook portion 16, there is very little possibility of the fish dislodging the hook or fighting free.

Referring now to the embodiment shown in FIGURE 7, the hook 10 is fitted with a barb 40 having a body 41 including side flanges 42, a tip 43 and a spur 44. Fitted to the body 41, between the side flanges 42 and near the spur 44, is a small magnet 46. The metal of the hook is, of course, magnetic so that when the barb 40 is disposed in the normal position shown by solid lines in FIGURE 7, the magnet 46 attaches itself to the portion 16 of the hook. When the magnet is so attached, the barb 40 is held tightly in normal position and slight resistance initially is offered to movement of the barb away from this position and towards the cross position shown by dotted lines in FIGURE 7. The weight of the magnet, as well as the previously described over balancing of the barb, tends to keep the barb in normal or latched position.

In the embodiment of the invention of FIGURES 8 and 9, an enlarged hook 50 is shown which has a shank 51. Shank 51 has a hook portion 52 which is fitted with a barb 20A, this barb being of the same construction and operating in the same manner as barb 20 of the preferred embodiment of the invention. Alternatively, the barb of FIGURE 7 may be fitted to this enlarged hook.

The upper end of shank 51 terminates in a cylindrical tang 54. A handle 55, having a socket 56, is fitted to the hook 50 with the tang 54 being lodged in the correspondingly shaped socket of the handle. Secured to a side of the handle 55, is a leaf spring 58 which is provided on its lower end with an inwardly-projecting locking pin 59. Pin 59 is adapted to project through an opening 60 formed in the handle and to enter into a recess 61 formed in the tang 54, see particularly FIGURE 9. It will be apparent that pin 59 normally is held seated within the recess by the pressure of spring 58 so that the handle 55 is locked to the upper end of the shank 51. Near the tang 54, the shank 51 is provided with a small half-ring 64.

The enlarged hook 50 is intended to be used as a gaff and when a fish is seized by the device, the barb 20A is dislodged from its normal position so that it can swing to an angular position which prevents the fish from fighting free of the hook. Normally a fisherman tries to gaff a fish through the gills or lower jaw so as not to damage the flesh anymore than can be helped and to ensure easy removal of the gaff. The barb 20A may end up in the mouth of the fish, for example, with the hook portion 52 extending through the soft flesh of the lower jaw. If this occurs, it may be easier to feed the hook 50 through the fish in the same direction as it entered. To accomplish this, the spring 58 is flexed outwardly to withdraw the pin 59 from the recess 61, which movement will allow the handle 55 to be removed from the tang 54. The hook 50 can then be fed through the fish in the desired direction without the handle or any other part of the device forming an obstruction which would hinder the movement of the hook.

If desired, the handle 55 can be removed from the tang 54 and the hook 50 still embedded in the fish. A line 65 is then secured to the half-ring 64 and also to another object, i.e., the stern of a boat. Thus, the fish can safely be trailed through the water secured by the gaff hook until fishing is over.

What is claimed is:

1. A fishhook comprising a hook portion having an upper end, a barb having a tip and a spur at opposite ends thereof, hinge means connecting the barb to the upper end, said hinge means engaging the barb between the tip and the spur, said barb being swingable about the hinge means from a normal position substantially parallel to the hook portion to a cross position at an angle to said hook portion, and latching means for securing the barb to the hook portion initially to offer yielding resistance to swinging movement of said barb away from the normal position, said latching means comprising an indent on the barb adapted yieldably to engage a part of the hook portion.

2. A fishhook comprising a hook portion having an upper end, a barb having a tip and a spur at opposite ends thereof, hinge means connecting the barb to the upper end, said hinge means engaging the barb between the tip and the spur, said barb being swingable about the hinge means from a normal position substantially parallel to the hook portion to a cross position at an angle to said hook portion, and latching means for securing the barb to the hook portion initially to offer yielding resistance to swinging movement of said barb away from the normal position, said latching means comprising a magnet on the barb adapted yieldably to engage a magnetic part of the hook portion.

3. A fishhook as claimed in claim 1, in which said barb includes a body having side flanges which embrace the hook portion, said hinge means comprising a hinge pin connecting the upper end to the side flanges, and one of said flanges having said indent.

4. A fishhook as claimed in claim 3, in which said body has a stop lug, adapted to engage the upper end of the hook portion to halt swinging movement of the barb beyond the cross position.

5. A fishhook as claimed in claim 3, and including a shank extending upwardly of the body portion, a tang on the upper end of the shank, a handle having a socket in which the tang is received, a leaf spring secured at one end of the handle, a locking pin carried by the free end of the leaf spring, said tang having a recess to receive the locking pin whereby to releasably secure the handle to the tang.

References Cited

UNITED STATES PATENTS

| 595,995 | 12/1897 | Dreese | 43—43.16 |
| 802,445 | 10/1905 | Evans | 43—43.16 |
| 1,913,810 | 6/1933 | Lannes | 43—6 |
| 2,884,733 | 5/1959 | Smith | 43—44.83 X |
| 2,984,041 | 5/1961 | Banker | 43—43.16 |
| 2,859,970 | 11/1958 | Doonan. | |

ALDRICH F. MEDBERRY, Primary Examiner

D. J. LEACH, Assistant Examiner

U.S. Cl. X.R.

43—5, 53.5